(12) United States Patent
Xu et al.

(10) Patent No.: US 7,676,349 B2
(45) Date of Patent: Mar. 9, 2010

(54) INTEGRATED ANISOTROPIC ROCK PHYSICS MODEL

(75) Inventors: Shiyu Xu, Kingwood, TX (US);
Rebecca L. Saltzer, Houston, TX (US);
Robert G. Keys, Houston, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 256 days.

(21) Appl. No.: 11/666,374

(22) PCT Filed: Oct. 27, 2005

(86) PCT No.: PCT/US2005/039002

§ 371 (c)(1),
(2), (4) Date: Apr. 26, 2007

(87) PCT Pub. No.: WO2006/062612

PCT Pub. Date: Jun. 15, 2006

(65) Prior Publication Data

US 2008/0086287 A1     Apr. 10, 2008

Related U.S. Application Data

(60) Provisional application No. 60/633,675, filed on Dec. 6, 2004.

(51) Int. Cl.
G06F 7/60    (2006.01)
G06F 17/10   (2006.01)
(52) U.S. Cl. .................................... 703/2; 703/10
(58) Field of Classification Search .............. 703/2, 703/10
See application file for complete search history.

(56) References Cited

U.S. PATENT DOCUMENTS

| | | | |
|---|---|---|---|
| 5,077,697 A | 12/1991 | Chang | 367/31 |
| 5,659,135 A | 8/1997 | Cacas | 73/152.02 |
| 5,675,147 A | 10/1997 | Ekstrom et al. | 250/256 |
| 5,828,981 A | 10/1998 | Callender et al. | 702/6 |
| 5,869,755 A | 2/1999 | Ramamoorthy et al. | 73/152.05 |
| 6,088,656 A | 7/2000 | Ramakrishnan et al. | 702/13 |
| 6,098,021 A * | 8/2000 | Tang et al. | 702/14 |
| 6,374,185 B1 | 4/2002 | Taner et al. | 702/6 |

(Continued)

OTHER PUBLICATIONS

Boris Gurevish, Jose M. Carcione, "Gassmann Modeling of Acoustic Properties of Sand-clay Mixtures" Pure appl. geophys. 157, 2000, pp. 811-827.*

(Continued)

*Primary Examiner*—Paul L Rodriguez
*Assistant Examiner*—Dwin M Craig

(57) ABSTRACT

Method for constructing an integrated rock physics model that simulates both shale anisotropy and stress-induced anisotropy of clastic rocks. In the model, the total pore volume is divided into three parts according to the estimated shale volume and effective stress: (1) clay-related pores, (2) sand-related pores, and (3) microcracks (mainly in the sand component). The pore space is then partitioned into the clay-related and sand-related pores using a scheme first disclosed by Xu and White in 1995. The model simulates shale anisotropy via the preferred orientation of clay-related pores and stress-induced anisotropy via the preferred orientation of microcracks, which is controlled by the differential stresses. Laboratory measurements or well logs are needed to establish a relationship between crack density and the effective stress.

18 Claims, 4 Drawing Sheets

U.S. PATENT DOCUMENTS

| | | | |
|---|---|---|---|
| 6,470,274 | B1 | 10/2002 | Mollison et al. ............... 702/7 |
| 6,473,696 | B1 | 10/2002 | Onyia et al. .................... 702/6 |
| 6,493,632 | B1 | 12/2002 | Mollison et al. ............... 702/2 |
| 6,529,833 | B2 | 3/2003 | Fanini et al. ................... 702/7 |
| 6,674,432 | B2 | 1/2004 | Kennon et al. .............. 345/419 |
| 6,711,502 | B2 | 3/2004 | Mollison et al. ............... 702/6 |
| 6,715,551 | B2 | 4/2004 | Curtis et al. .......... 166/250.16 |
| 6,751,558 | B2 | 6/2004 | Huffman et al. ............. 702/14 |
| 6,795,773 | B2 | 9/2004 | Soliman et al. ................ 702/6 |
| 6,904,365 | B2 | 6/2005 | Bratton et al. ................. 702/9 |
| 6,941,255 | B2 | 9/2005 | Kennon et al. ................ 703/10 |
| 6,959,246 | B2 | 10/2005 | Herron ........................ 702/12 |
| 6,977,866 | B2 | 12/2005 | Huffman et al. ............... 367/73 |
| 6,987,385 | B2 | 1/2006 | Akkurt et al. ............... 324/303 |
| 7,006,951 | B2 | 2/2006 | Pond, Jr. et al. ................ 703/2 |
| 7,027,964 | B2 | 4/2006 | Kennon ......................... 703/2 |
| 7,043,413 | B2 | 5/2006 | Ward et al. .................... 703/10 |
| 7,111,681 | B2 | 9/2006 | Detournay et al. ....... 166/250.1 |
| 7,149,671 | B2 | 12/2006 | Lim et al. ...................... 703/9 |
| 7,260,508 | B2 | 8/2007 | Lim et al. ...................... 703/2 |
| 7,286,939 | B2 | 10/2007 | Bachrach et al. ............. 702/14 |
| 2002/0067373 | A1 | 6/2002 | Roe et al. ................... 438/775 |

OTHER PUBLICATIONS

Jack Dvorkin, Mario A. Gutierrez, "Grain Sorting, Porosity, And Elasticity" Geophysics Department, Stanford University, Jul. 24, 2001, pp. 1-19.*

Baztle and Wang (1992) Geophysics 57, pp. 1396-1408.

Biot, M. A. (1956) "Theory of propagation of elastic waves in a fluid saturated porous solid," *Journal of Acoustic Society of America* 28, pp. 168-191.

Brown and Korringa (1975) On the dependence of elastic properties of a porous rock on the compressibility of the pore fluid, *Geophysics* 40, pp. 608-616.

Eshelby (1957) "The determination of the elastic field of an ellipsoidal inclusion, and related problems," *Proceedings of Royal Society of London, Series A* 241, pp. 376-396.

Hill (1965), *Journal of Mechanics and Physics of Solids* 13, pp. 213-222.

Hornby, et al. (1994) *Geophysics* 59, pp. 1570-1583.

Keys and Xu (2002) "An approximation for the Xu-White velocity model," *Geophysics* 67, pp. 1406-1414.

Kuster, G.T. and M.N. Toksoz, (1974) "Velocity and attenuation of seismic waves in two-phase media, Part1: Theoretical formulation," *Geophysics* 39, pp. 587-606.

Lin, S. and Mura, T. (1973) *Phys. Status Solidi*, (a)15, pp. 281-285.

Mavko, et al. (1996) *Rock Physics Handbook*, Stanford University p. 126-127.

Nishizawa (1982) "Seismic velocity anisotropy in a medium containing oriented cracks-Transversely isotropic case," *Journal of Physical Earth* 30, 331-347.

Willis (1977) *J. Mech. Phys. Solids* 25, pp. 185-202.

Xu and White (1995) "A new velocity model for clay-sand mixtures," *Geophysical Prospecting* 43, pp. 91-118.

Xu and White (1996) "A physical model for shear-wave velocity prediction," *Geophysical Prospecting* 44, pp. 687-717.

EP Search Report No. RS 112343US, dated Jun. 20, 2005, 2 pgs.

PCT Search & Written Opinion dated Jan. 25, 2007, 6 pgs.

* cited by examiner

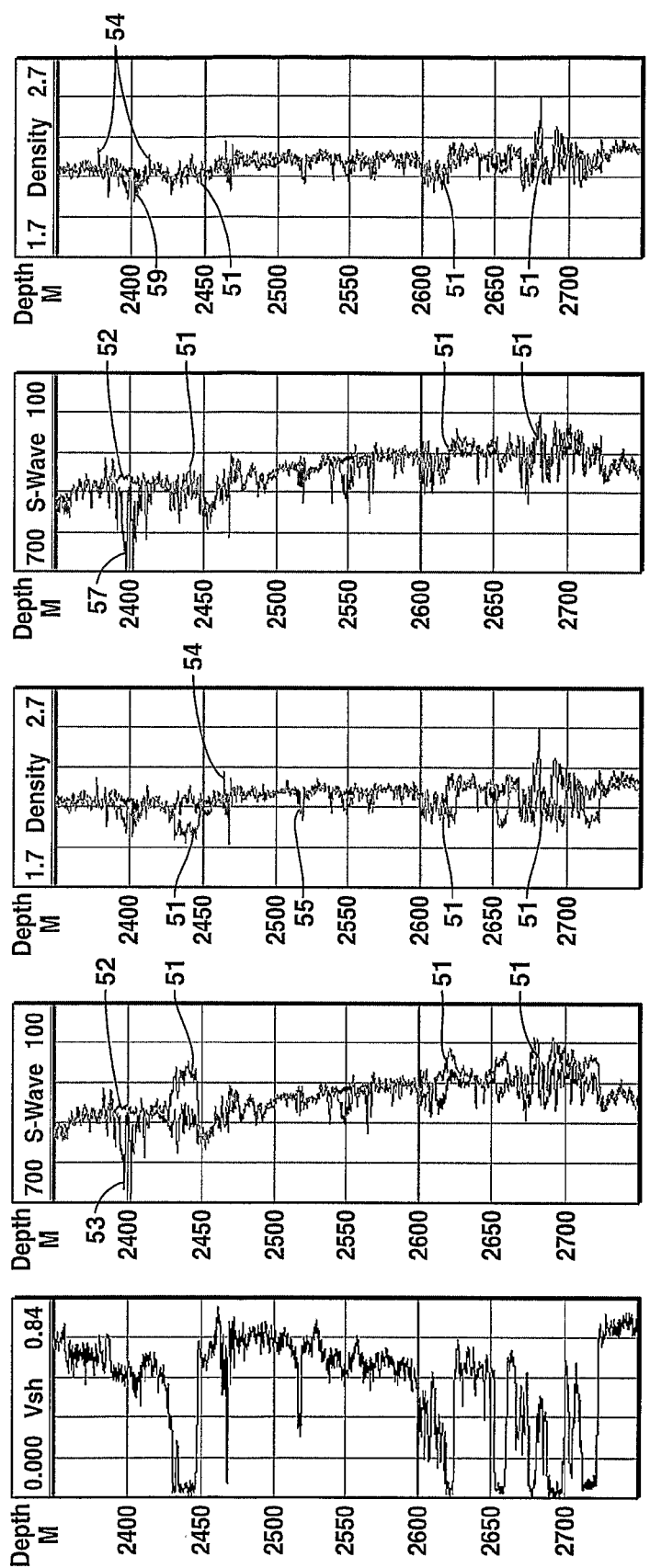

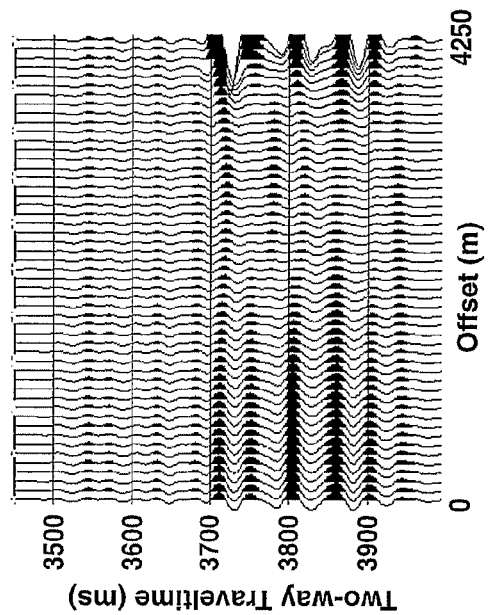
FIG. 6A
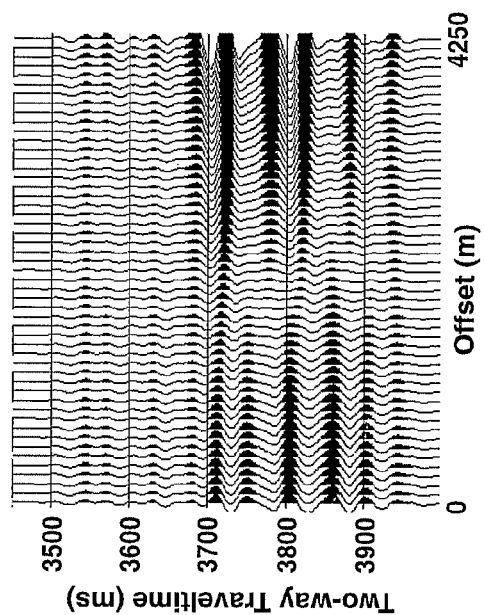
FIG. 6A1
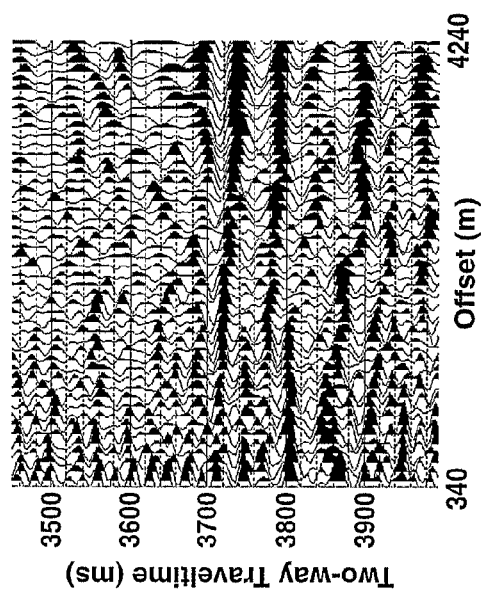
FIG. 6B
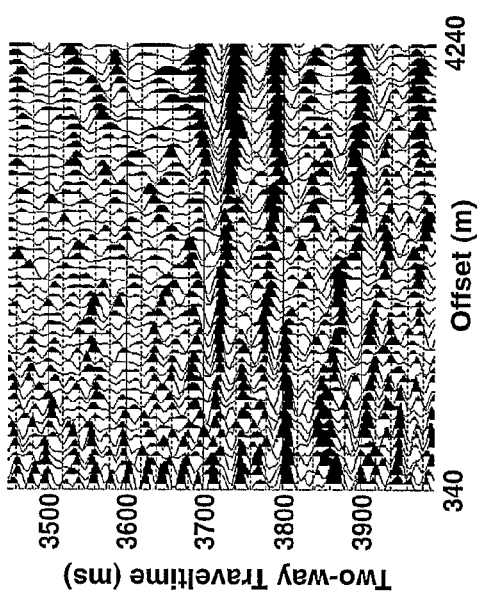
FIG. 6C

INTEGRATED ANISOTROPIC ROCK PHYSICS MODEL

CROSS REFERENCE TO RELATED APPLICATIONS

This application is the National Stage of International Application No. PCT/US2005/039002, filed 27 Oct. 2005, which claims the benefit of U.S. Provisional Patent Application No. 60/633,675 filed Dec. 6, 2004.

FIELD OF THE INVENTION

This invention relates generally to the field of geophysical prospecting and, more particularly, to rock physics modeling and methods for predicting and relating elastic properties, which affect seismic data and therefore can be deduced from seismic data, and petrophysical properties. Specifically, the invention is a method for constructing a rock physics model of a subterranean region that accounts for anisotropy in the region.

BACKGROUND OF THE INVENTION

Rock physics modeling plays a critical role in seismic inversion and interpretation by providing a critical link between petrophysical properties (e.g., porosity, shale volume, water saturation, etc.) and seismic properties (e.g., P- and S-wave velocities, attenuation and frequency content). It is, therefore, extremely important to build an accurate and robust rock physics model that represents the combined effect of the key controlling factors, such as porosity, pore geometry, pore connectivity, fluid type (or water saturation), clay content, mineralogy, stress, temperature and anisotropy.

It is well known that sedimentary rocks (the type of rock where petroleum can often be found) are anisotropic in nature. That is, their elastic properties vary with direction. Recent published literature shows that seismic anisotropy is a primary factor controlling the amplitude-versus-offset (AVO) behavior. In a CMP (common-middle point) gather, the amplitude of a seismic reflection from a particular interface varies with offset or incident angle. The behavior of the amplitude change with offset can be linked to fluid content in the rock. For example, typical gas sands overlain by shale are often characterized by a "Class III" type AVO, i.e., negative polarity at the interface and increasing amplitude with offset. Oil sands may display Class II type AVO, i.e., very weak amplitude at the near offset and strong amplitude at the far offset. The present inventors have found that the anisotropy effect is particularly important for high-impedance sands (the acoustic impedance of the sands is higher than the acoustic impedance of their surrounding shale). FIG. 1 shows P-wave reflectivity over a single interface as a function of incident angle using both isotropic 11 and anisotropic 12 earth models. It clearly demonstrates that anisotropy is an important factor for AVO modeling. This is particularly true for incident angles larger than 30 degrees. The results also demonstrate that a theoretical rock physics model with anisotropic capabilities is highly desirable.

There are two important types of anisotropy in clastic sedimentary rocks: (1) shale anisotropy and (2) stress-induced anisotropy. Shale anisotropy is common in clastic rocks. Shale anisotropy is the most common anisotropy in sedimentary rock. This is simply because over 70% of sedimentary rocks are shale. Shale anisotropy is caused by the preferred orientation of the pore space between the clay particles. Stress-induced anisotropy is caused by the differential stresses in the earth crust. In general, the three principal stresses are often different from each other due to the tectonic movement of the earth crust and overburden effect. In a typical relaxed sedimentary basin, assuming negligible tectonic movement, the vertical stress is often much higher than the two horizontal stresses. In the major principal stress direction, the rock is compressed more in comparison with the compression at the other two directions. This differential compaction will result in a differential closure of soft pore, or cracks, in the rock. Cracks aligned perpendicular to the major principal stress have a higher tendency of being closed than cracks aligned in other directions. Consequently, the compressional wave will travel faster in the major principal stress direction.

In general, shale anisotropy is strong (higher than 10%). Seismic anisotropy is typically measured using Thomsen parameters, $\epsilon$, $\gamma$ and $\delta$, which are defined as follows:

$$\varepsilon = \frac{C_{11} - C_{33}}{2C_{33}}$$

$$\gamma = \frac{C_{66} - C_{44}}{2C_{44}}$$

$$\delta = \frac{(C_{13} + C_{44})^2 - (C_{33} - C_{44})^2}{2C_{33}(C_{33} - C_{44})}$$

Here, $C_{ij}$ is the elastic tensor of the anisotropic rock. The quantity $\epsilon$ approximately measures the P-wave anisotropy, i.e. the relative change between P-wave velocity in the fast direction and that in slow direction. Similarly, $\gamma$ measures shear-wave anisotropy. $\delta$ controls the P-wave and SV-wave velocity profiles at intermediate angles between the fast and slow direction. Typically, $\epsilon$ or $\delta$ is used to quantify seismic anisotropy. A characterization of 20% anisotropy thus means that the P- or S-wave velocity in the fast direction is about 20% faster than that in the slow direction.

Because shale anisotropy is strong, it has a larger effect than stress-induced anisotropy on AVO modeling. Stress-induced anisotropy is commonly seen in shallow unconsolidated sands where the vertical effective stress can be significantly higher than the horizontal effective stresses. In cases where there is little tectonic movement, stress-induced anisotropy cannot be measured using cross-dipole logs since the two horizontal stresses are more or less the same. In areas where the tectonic movement is large, azimuthal anisotropy exists and can be measured using cross-dipole logs. Unlike shale anisotropy, stress-induced anisotropy is more difficult to predict because the principal stresses are controlled by many factors including overburden, tectonic, local structures, fault systems and rock properties.

Various theories called effective medium theories have been proposed to simulate shale or stress-induced anisotropy in rocks. Some of these are briefly discussed below. Most of these theories ignore the mechanical interaction between the pores/cracks. These effective medium theories are therefore valid only for dilute concentration of pores. This limitation makes the first-order theories of little practical use. The problem can be resolved using the differential effective medium (DEM) scheme or the self-consistent (SC) scheme. DEM is discussed by Nishizawa in *Journal of Physical Earth* 30, 331-347 (1982) and by Hornby, et al. in *Geophysics* 59, 1570-1583 (1994). SC is discussed by Hill in *Journal of Mechanics and Physics of Solids* 13, 213-222 (1965) and by Willis in *J. Mech. Phys. Solids* 25, 185-202. (1977). However, either scheme drastically slows down the numerical computation. It would be desirable, to speed up the calculations while maintaining the accuracy of the method. Furthermore, there is no model that can handle both shale anisotropy and stress-induced anisotropy simultaneously. The present invention satisfies both of these needs.

Empirical rock physics models are widely used in the industry due to their simplicity. These empirical models typically assume a linear relationship between P-wave (or S-wave) velocity, porosity and/or shale volume. Despite some limited success of such models, there are increasing concerns about their applicability to seismic inversion (i.e., solving for petrophysical properties using seismic data) since they are data-driven. Without a large amount of data to calibrate these empirical models, they often provide incorrect, sometimes even misleading, results. In many exploration and/or development circumstances, one often does not have the data needed for the calibration. Another major drawback with the empirical models is that they provide little physical insight. For example, one may find a simple relationship between permeability and velocity and conclude that permeability is a major controlling factor for velocity when, in fact, the velocity change is largely caused by porosity. A good correlation between porosity and permeability makes permeability look like a controlling factor for velocity. Permeability matters, but usually has a secondary effect on velocity. Finally, an empirical model can only handle a very limited number of factors, typically fewer than three. For comprehensive rock physics modeling, one needs to consider the combined effect of porosity, pore type, shale volume, fluid content (water saturation), fluid communication, pressure, temperature and frequency.

There are a limited number of theoretical rock physics models in the literature. For example, M. A. Biot, "Theory of propagation of elastic waves in a fluid saturated porous solid," *Journal of Acoustic Society of America* 28, 168-191 (1956); G. T. Kuster and M. N. Toksoz, "Velocity and attenuation of seismic waves in two-phase media, Part 1: Theoretical formulation," *Geophysics* 39, 587-606 (1974). In general, these models can be used to explain the elastic behavior observed in the laboratory. However, it is often difficult to apply these models to real cases (e.g., well logs). Xu and White developed a practical model that simulates the combined effect of a number of factors on P- and S-wave velocities. ("A new velocity model for clay-sand mixtures," *Geophysical Prospecting* 43, 91-118 (1995); and "A physical model for shear-wave velocity prediction," *Geophysical Prospecting* 44, 687-717 (1996)) But the model does not handle the anisotropy effect. Hornby, et al. propose an effective medium model to simulate shale anisotropy (*Geophysics* 59, 1570-1583 (1994)). But, their model is limited to pure shales only, not applicable to sandy shales or shaly sands. This greatly limits the applicability of their model since sedimentary rocks are made of not only shales but also other rock types, such as sandstone, siltstone, limestone, etc. Also, Hornby's approach is valid for high frequencies only and it is, therefore, always Gassmann-inconsistent. Gassmann's theory has been widely used in the oil industry for fluid substitution (hypothetically substituting pore fluid in reservoir rocks from one type to another, e.g., from water to oil). One key assumption in Gassmann's theory is that the frequency of the seismic wave is low enough so that pore pressure has ample time to be equilibrated. Therefore, any model which gives the low frequency response or equalized pore pressure is called Gassmann-consistent.

Keys and Xu (*Geophysics* 67, 1406-1414 (2002)) propose a dry rock approximation method, which dramatically speeds up the numerical calculation of the differential effective medium scheme while maintaining its accuracy. Unfortunately, the proposed method does not work for the anisotropic case.

Fluid substitution is an important topic for seismic identification of reservoir fluid. Traditionally, different fluid phases, e.g. gas and brine, are mixed using the Wood Suspension law before they are put into the rock using Gassmann (1951) equations. This approach puts fluid mixtures uniformly into all the pore space, regardless of the pore size, wettability and permeability of the rock. Laboratory measurements demonstrate that the approach is probably applicable to rocks with relatively high permeability and at relatively high effective stresses where micro-cracks are closed. It is highly questionable if the approach is valid in shaly sands, in which micro-pores tend to be water-wet due to the capillary effect.

Thus, there is a need for developing an anisotropic rock physics model, which has a fundamental physical basis. The model should be Gassmann-consistent and correctly treat the capillary effect on different fluid phase distribution at pore scale. The model should be accurate and efficient enough to be applied to well log analysis and/or seismic inversion. In particular, the model should be able to handle different kinds of anisotropy (e.g., shale and stress-induced anisotropy). The present invention fills this need.

SUMMARY OF THE INVENTION

In one of its embodiments, the present invention is a method for generating an anisotropic rock-physics computational model of a subterranean region that simulates both shale anisotropy and stress-induced anisotropy, said model having a pore volume, a shale volume and a sand volume, said method comprising: (a) dividing the model's pore volume into clay-related pores, sand-related pores, and microcracks; (b) selecting mathematical relationships whereby said division of the pore volume into three parts can be made quantitative based on estimates of overburden stress and shale volume fraction in the subterranean region; (c) mixing sand grains with clay particles in said model using a first mixing law; (d) adding wet clay pores with a preferred orientation distribution to the clay-related part of the pore volume of said model; (e) adding empty sand pores and aligned microcracks to the sand and microcrack parts, respectively, of the pore volume of said model; (D mixing hydrocarbons with water using a second mixing law; thereby forming a fluid mixture within said model; (g) placing the fluid mixture into the sand pores and microcracks of said model using anisotropic Gassmann theory; and (h) calibrating parameters in the model using measured data.

In one embodiment of the invention, the aforesaid mathematical relationships are selected as follows: the portion $\phi_{Clay}$ of the model's pore volume $\phi_T$ that is clay-related pores is given by $\phi_{Clay}=V_{sh}\phi_T$; the portion $\phi_{Sand}$ that is sand-related pores is given by $\phi_{Sand}=(1-V_{sh})\phi_T$, the portion $\phi_{Crack}$ that is microcracks is given by $\phi_{Crack}=\phi_{Init}e^{-\beta\sigma_0}$; and the portion $\phi_{Sand}^{Iso}$ that is sand-related pores with random orientation distribution is given by $\phi_{Sand}^{Iso}=\phi_{Sand}-\phi_{Crack}$, where $V_{sh}$ is the shale volume normalized by grain matrix, $\phi_T=\phi_{Clay}+\phi_{Sand}^{Iso}+\phi_{Crack}$, $\phi_{Init}$ is initial crack porosity at zero overburden stress $\sigma_0$, and $\beta$ is pressure gradient in the subterranean region.

BRIEF DESCRIPTION OF THE DRAWINGS

The present invention and its advantages will be better understood by referring to the following detailed description and the attached drawings in which:

FIGS. 5A-5E illustrate the effect of stress-induced anisotropy on S-wave and density predictions; and FIGS. 6A-6C illustrate the effect of anisotropy on a well-to-seismic-gather tie (FIG. 6A1 is a duplicate of FIG. 6A).

Figure 1:
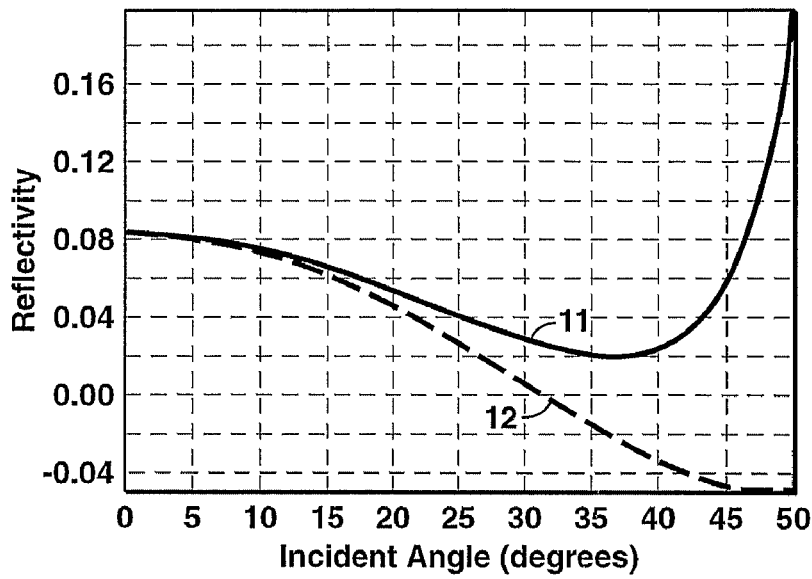
FIG. 1 is a graph illustrating the effect of rock anisotropy on the reflectivity of the rock.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present invention provides an integrated anisotropic rock physics model that simulates both shale anisotropy and stress-induced anisotropy of clastic rocks. The model also handles the combined effect of porosity, shale volume, water saturation, pressure, temperature, and pore fluid communication on P- and S-wave velocities in a consistent manner. In the model and as summarized in equation (1), the total pore volume is divided into three parts according to the estimated shale volume and effective stress: (1) clay-related pores, (2) sand-related pores, and (3) microcracks (mainly in the sand component).

$$\phi_T = \phi_{Clay} + \phi_{Sand}^{Iso} + \phi_{Crack} \quad (1)$$

The model simulates shale anisotropy via the preferred orientation of clay-related pores ($\phi_{Clay}$) and stress-induced anisotropy via the preferred orientation of microcracks ($\phi_{Crack}$), which is controlled by the differential stresses. Laboratory measurements or well logs are needed to establish a relationship between crack density and the effective stress.

The pore space is partitioned into the clay- and sand related pores using the scheme proposed by Xu and White:

$$\phi_{Clay} = V_{sh} \phi_T \quad (2)$$

$$\phi_{Sand} = \phi_T - \phi_{Clay} \quad (3)$$

where $V_{sh}$ is the shale volume normalized by grain matrix. The anisotropy in shale is assumed to be caused by a preferred orientation distribution of the clay-related pores, which can be described by, for example, a Gaussian distribution. The sand pores are further divided into two types: (1) primary porosity, $\phi_{Sand}^{Iso}$, which has a random orientation distribution, and (2) microcracks, $\phi_{Crack}$, which have a preferred orientation distribution. The primary sand porosity is assumed to be independent of stress. But the orientation distribution of the microcracks and the crack porosity are determined by the three principal stresses. In the relaxed geological setting, for example, the vertical stress is typically higher than the two horizontal stresses. In this particular case, micro-cracks tend to be oriented vertically. As a result, P-wave velocity tends to be faster in the vertical direction than in the two horizontal directions.

Laboratory measurements demonstrate that crack porosity can be linked to the overburden stress using an empirical relation. For example, $$\phi_{Crack} = \phi_{Init} e^{-\beta \sigma_0} \quad (4)$$

where $\phi_{Init}$ is the initial crack porosity at zero overburden stress ($\sigma_0$) and $\beta$ is the pressure gradient. Finally, the primary sand porosity with random pore orientation can be written as, $$\phi_{Sand}^{Iso} = \phi_{Sand} - \phi_{Crack} \quad (5)$$

In short, the model simulates shale anisotropy via the preferred orientation of clay-related pores and stress-induced anisotropy via the preferred orientation of microcracks, which is controlled by the differential stresses. Laboratory measurements or well logs may be used to establish a relationship between crack density and the effective stress.

Figure 2:
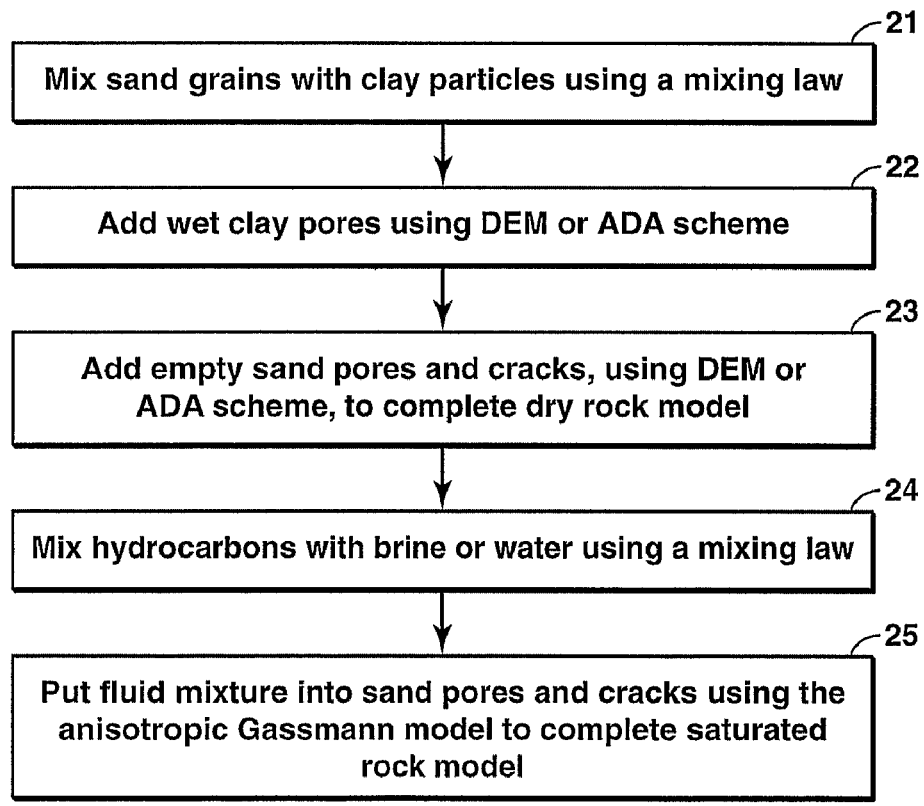
FIG. 2 is a flow chart showing the basic steps of one embodiment of the present inventive method.
Figure 3:
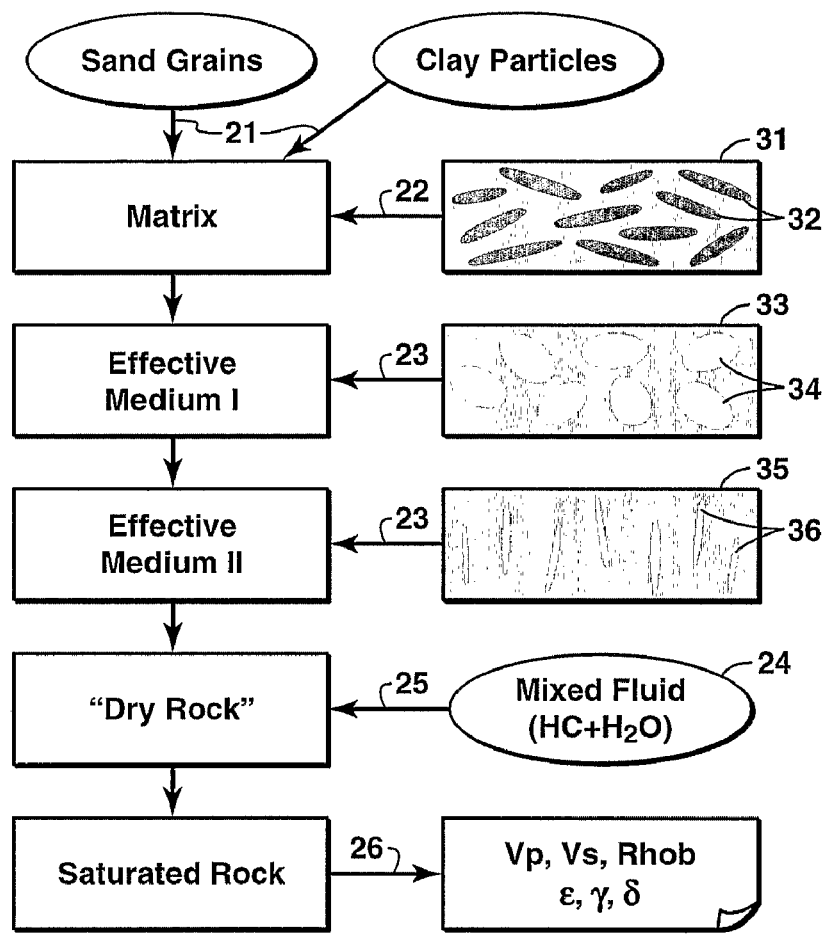
FIG. 3 is a schematic diagram further illustrating the flow chart of FIG. 2.

FIG. 2 is a flow chart showing how the model works. The model is more graphically illustrated by the schematic diagram of FIG. 3. In step 21, the sand grains are mixed with clay particles using a mixing law (e.g., the Voigt-Reuss-Hill average). In step 22, the clay pores are added to the matrix using the differential effective medium (DEM) scheme or using the anisotropic dry rock approximation (ADA) scheme, which will be described later, in order to consider the mechanical interaction between the pores. The added clay-related pores are assumed to always be water-wet due to the capillary effect (see discussion below). In step 23, the primary sand pores and the microcracks are added to the system in a similar manner, except that there is no fluid in those pores or cracks to be added to the system at this point. In step 24, hydrocarbons are mixed with brine/water using a mixing law, such as the Wood's Suspension Model. (Wood's Suspension Model is discussed, for example, on page 126 of the book *Rock Physics Handbook*, by Mavko, et al., Stanford University (1996); the Voigt-Reuss-Hill Average is discussed on page 127 of the same book.) In step 25, the anisotropic Gassmann model is then used to put the fluid mixture in sand pores (including microcracks) into the system. (See Brown and Korringa, "On the dependence of elastic properties of a porous rock on the compressibility of the pore fluid, *Geophysics* 40, 608-616 (1975)). P- and S-wave velocities and Thomsen parameters may then be calculated (step 26 of FIG. 3) from the effective elastic constants that can be obtained using the rock model created by the above-described procedures. Further features represented in FIG. 3 are the division of the model's pore volume into a part 31 containing fluid (brine) filled clay-related pores 32, a part 33 containing empty sand-related pores 34, and a part 35 containing empty microcracks 36. Various features of the inventive method of FIGS. 2 and 3 will next be discussed further.

Effect of Micro-Porosity on Fluid Phase Distribution and Fluid Substitution

The present inventive method treats micro-porosity and fluid distribution at the pore scale differently than traditional approaches do. Traditional Gassmann fluid substitution models assume uniformly mixed fluid phases and put the fluid mixture into the pore space regardless of the pore sizes. The anisotropic micro-porosity model of the present invention, on the other hand, assumes that micro-pores, or pores associated with clays, tend to be occupied by the water phase because of their smaller size compared to sand pores. This is mainly because the capillary pressure in clay pores is significantly lower than the capillary pressure in sand pores. That concept is implemented by adding clay-related pores to the system with brine/water (Step 22.). This can be expected to give a high-frequency response for the clay-related pores in terms of the fluid flow mechanisms since all the DEM theories assume isolated pore space.

However, the sand pores (including cracks) are treated differently. As stated above, they are added to the system first and then the anisotropic Gassmann equations are used to put fluid mixtures into the empty pores/cracks. Since Gassmann theories assume equalized pore pressure among the sand pores, this can be expected to give a low-frequency response for sand pores.

Anisotropic Gassmann Fluid substitution needs the compliance tensor of the solid matrix as input parameters. For traditional Gassmann fluid substitution, this is straightforward. In the present inventive method, however, this is more complicated since fluid substitution is performed for the sand pores only assuming that clay pores are water-wet. In this case, the clay-pores are treated as part of the "solid matrix," and the compliance tensor of the equivalent "solid matrix," which contains all the clay-pores, is calculated using the differential effective medium theory or the anisotropic dry rock approximation method to be described below. The calculated compliance tensor is then used for anisotropic Gassmann fluid substitution.

Differential Effective Medium (DEM) Theory

Nishizawa showed how to calculate the effective elastic constant tensor for a solid embedded with parallel pores. ("Seismic velocity anisotropy in a medium containing oriented cracks-Transversely isotropic case," *Journal of Physical Earth* 30, 331-347 (1982)) The present invention extends Nishizawa's theory to the case where the pores may have a preferred orientation distribution and formulates the differential equations in the approach suggested by Hornby, et al.

$$\frac{dA}{d\phi} = \frac{1}{1-\phi} \sum_\alpha \int_0^{\pi/2} \int_0^{2\pi} F_\alpha(\theta, \varphi) H_\alpha(\theta, \varphi) A \, d\varphi \, d\theta \quad (6)$$

where $\alpha$ is the aspect ratio. $F_\alpha(\theta,\phi)$ is the probability density function for the orientation distribution of pores/cracks and $\theta$ and $\phi$ are polar angle and azimuth, respectively. Therefore, $$\int_0^{2\pi} \int_{-\frac{\pi}{2}}^{\frac{\pi}{2}} F_\alpha(\theta, \varphi) \, d\theta \, d\varphi = 1, \quad (7)$$

Further, A is the compliance tensor of the effective medium to be determined and $\phi$ is porosity, $$H_\alpha(\theta, \phi)_{ijkl} = T_{ijklmnpq} Q(\alpha)_{mnpq} \quad (8)$$

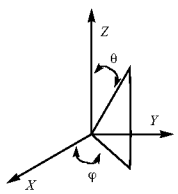

and finally, $$T_{ijklmnpq} = K_{im} K_{jn} K_{kp} K_{lq} \quad (9)$$

$$K = \begin{bmatrix} \cos(\theta)\cos(\varphi) & -\sin(\varphi) & \sin(\theta)\cos(\varphi) \\ \cos(\theta)\sin(\varphi) & \cos(\varphi) & \sin(\theta)\sin(\varphi) \\ -\sin(\theta) & 0 & \cos(\theta) \end{bmatrix} \quad (10)$$

$$Q(\alpha) = [(C_0 - C^I)S(\alpha) - C_0]^{-1}[C^I - C_0] \quad (11)$$

Tensor Q is calculated in the local coordinate system, where its z-axis is chosen parallel to the symmetry axis of the inclusion. Here $C_0$ and $C^I$ are the elastic constant tensors of the solid and fluid phases, respectively. S is the Eshelby (1957) tensor, which is a function of the pore shape (aspect ratio). ("The determination of the elastic field of an ellipsoidal inclusion, and related problems," *Proceedings of Royal Society of London*, Series A 241, 376-396 (1957)). S can be calculated using equations given by Eshelby when the background solid is isotropic and those given by Lin and Mura when the background solid is transversely isotropic. (Lin, S. and Mura, T., *Phys. Status Solidi*, (a)15, 281-285 (1973)).

Anisotropic Dry Rock Approximation (ADA) Method

The differential effective medium theory described above gives reasonably accurate results, but it is computationally expensive. In order to improve the efficiency of the code, the present invention extends the dry rock approximation method developed by Keys and Xu (2002) to the anisotropic case. ("An approximation for the Xu-White velocity model," *Geophysics* 67, 1406-1414 (2002)) For dry rock, $C^I=0$, and the 4th order tensor Q defined by equation (11) can be written as, $$Q(\alpha)=[S(\alpha)-I]^{-1} \quad (12)$$

Here, I is the identity tensor. The key idea is that the S tensor is approximately independent of porosity in a dry rock and, therefore, remains constant. In this case, the differential equation (5) can be written as, $$\frac{dA}{d\phi} = \frac{1}{1-\phi} PA$$

$$\text{where } P = \sum_\alpha \int_0^{\pi/2} \int_0^{2\pi} F_\alpha(\theta, \varphi) H_\alpha(\theta, \varphi) \, d\varphi \, d\theta.$$

Solving the differential equation yields $$A=(1-\phi)^P A_0 \quad (13)$$

where $A_0$ is the compliance tensor of the solid matrix. A is the compliance tensor of the effective medium. Note that P is a fourth order tensor rather than a scalar. The anisotropic dry rock approximation dramatically increases the calculation speed.

Figure 4:
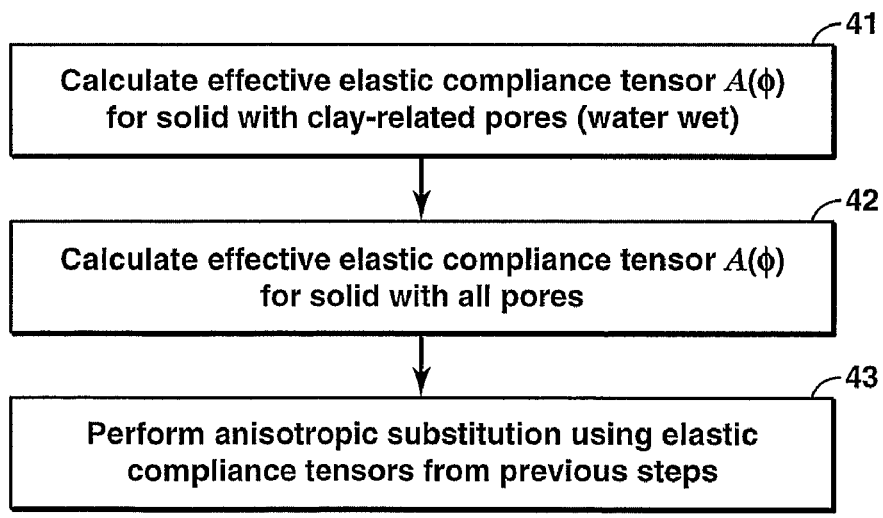
FIG. 4 is a flow chart of a differential effective medium scheme, as modified in the present invention, for proportionally adding different pore types to the model during construction of the model.

Implementation of the Differential Effective Medium Theory in a Porous Composite with Multi-Groups of Pores In a system with a single group of pores, the implementation of the differential effective medium scheme is straightforward. See Hornby et al., or O. Nishizawa, "Seismic velocity anisotropy in a medium containing oriented cracks—Transversely isotropic case," *Journal of Physical Earth*, 30, 331-347 (1982). In a system with multiple pore types, different types of pores are typically added to the system sequentially using the DEM scheme (e.g. Xu and White, 1995). Thus, steps 22-24 in FIG. 2 may use the DEM scheme instead of the ADA scheme. The DEM theory is implemented in this way to make the subsequent Gassmann fluid substitution easier. However, this makes the final effective elastic compliance tensor asymmetric, i.e., the final effective elastic compliance tensor depends on the order in which the pores are added. Suppose that one has a bi-modal distribution of compliant and stiff pores. The result obtained by adding the compliant pores first will be different from that obtained by adding stiff pores first. To solve this problem, the present invention discloses a different scheme to implement the DEM theory. In this scheme, all pore types are added proportionally at each iteration. (The DEM scheme divides the total porosity into N groups. N can be, for example, 50 or 100 depending on the ratio of porosity to the aspect ratio. DEM then adds groups of pores to the system sequentially (one after another). At a particular stage when a group of pores is added to the system, the resultant effective medium in the previous stage is used as the background medium for this new stage. Each stage is referred to above as an iteration because the matrix elastic constants are updated at each iteration.) A three-step procedure is employed, as illustrated in the flow chart of FIG. 4. At step 41, the effective elastic compliance tensor for the solid with clay-related pores (water wet) only is calculated. At step 42, the effective elastic compliance tensor for the solid with all the pores (water wet for clay pores and dry for sand pores and cracks) is calculated. At step 43, anisotropic fluid substitution is performed using the elastic compliance tensors calculated above.

Implementation of the Model with Anisotropic Dry Rock Approximation

The compliance tensor $A(\phi)$ in Equation (13) is the heart of the anisotropic dry rock approximation. The tensor $(1-\phi)^P$ in Equation (13) can be defined by the power series expansion:

$$(1-\phi)^P = e^{\log(1-\phi)P} = \sum_{k=0}^{\infty} \frac{(\log(1-\phi))^k}{k!} P^k. \qquad (14)$$

The tensor P in Equation (14) is isomorphic to a 9×9 matrix. That is, there is a one-to-one transformation from the space of tensors of rank four onto the space of 9×9 matrices that preserves multiplication and addition. Consequently, the tensor P in Equation (14) can be replaced by a 9×9 matrix P, so that the power series in (14) is defined by ordinary matrix operations.

An estimate for the dry rock approximation can be obtained by truncating the series (14) after a sufficient number of terms. Numerical testing shows that Equation (14) gives accurate results if the power series is truncated after 30 terms.

EXAMPLES

The present inventive method was applied to log analysis and seismic modeling, and significant improvements were observed in S-wave prediction and well-to-seismic gather tie. FIGS. 5B-E compare the measured (darker curve) S-wave 52 (FIG. 5B) and density 54 (FIG. 5C) logs with the calculated (53, 55) using the traditional isotropic rock physics model. A consistent bias can be observed between the measured and the calculated over the sand intervals 51, corresponding to low values of $V_{sh}$, the shale volume fraction, which is shown as a function of depth in FIG. 5A. This was interpreted as the effect of stress-induced anisotropy in unconsolidated sands. FIGS. 5D (S-wave) and 5E (density) show that the present inventive method dramatically improves agreement between the calculated results 57, 59 and the measured data 52, 54 in the sand intervals 51.

In more detail, shear-wave and density logs can be predicted from the P-wave log (not shown) and the shale volume (shown in FIG. 5A) using an inversion method proposed by Xu and White (*Geophysical Prospecting* 44, 687-717 (1996)). In addition, elastic properties and density of the pore fluids are also required, which can be calculated using the correlations published by Baztle and Wang (Geophysics 57, 1396-1408 (1992)). To make the prediction, one also needs two more parameters for the isotropic rock physics model. They are the aspect ratios for sand-related and clay-related pores, respectively. For the anisotropic rock physics model, one needs 4 additional parameters. They are the aspect ratio for microcracks, a standard deviation for the orientation distribution for clay-related pores (assuming Gaussion distribution), a standard deviation for the orientation distribution for microcracks (again assuming Gaussion distribution) and crack density. The crack density can be calculated using equation (3). Those parameters can be calibrated using laboratory measurements and/or well logs (e.g. cross-dipole S-wave logs).

FIGS. 6A-C show the effect of anisotropy (both stress-induced and shale anisotropy) on seismic modeling. A seismic gather at the well is shown in FIG. 6A (FIG. 6A1 is a duplicate of FIG. 6A). FIG. 6B shows a synthetic gather generated by a traditional isotropic earth model. FIG. 6C shows a synthetic gather generated by the anisotropic earth model of the present invention. Obviously the anisotropic earth model improves well-to-seismic gather tie at far offset dramatically. In more detail, to judge if a well-to-seismic gather tie is good or poor, one has to compare the synthetic gather with a seismic gather at the well. Comparing the synthetic gather generated from the isotropic earth model (FIG. 6B) with a seismic gather at the well (FIG. 6A), one observes good agreement at the near-offset (the first 10-20 traces). But the seismic responses at far offset (last 10-20 traces) look very different. Therefore, one must label the well-to-seismic gather tie for the isotropic earth model as poor. Comparing FIG. 6C to FIG. 6A, there is good agreement at all offsets. Therefore, the well-to-seismic gather tie for the anisotropic earth model is very good. The result indicates that anisotropy is a primary factor for seismic modeling in this case.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

We claim:

1. A method for generating an anisotropic rock-physics model that relates elastic properties to petrophysical properties as a function of location in a subterranean region, wherein said model simulates both shale anisotropy and stress-induced anisotropy and has a pore volume, a shale volume and a sand volume, said method comprising:
    (a) dividing the model's pore volume into clay-related pores, sand-related pores, and microcracks, wherein the model's pore volume is divided according to estimated shale volume and effective stress;
    (b) selecting mathematical relationships whereby said division of the pore volume into three parts can be made quantitative based on estimates of overburden stress and shale volume fraction in the subterranean region;

(c) mixing sand grains with clay particles in said model using a first mixing law;
(d) adding wet clay pores with a preferred orientation distribution to the clay-related part of the pore volume of said model;
(e) adding empty sand pores and aligned microcracks to the sand and microcrack parts, respectively, of the pore volume of said model;
(f) mixing hydrocarbons with water using a second mixing law; thereby forming a fluid mixture within said model;
(g) placing the fluid mixture into the sand pores and microcracks of said model using anisotropic Gassmann theory;
(h) calibrating parameters in the model using measured data, wherein the calibration data include laboratory measurements or well logs; and
(i) using the calibrated model to relate petrophysical properties and elastic properties in the subterranean region.

2. The method of claim 1, wherein the clay pores, sand pores and microcracks are added to the model using a differential effective medium scheme.

3. The method of claim 2, wherein the differential effective medium scheme is simplified using an anisotropic dry rock approximation scheme.

4. The method of claim 1, wherein the differential effective medium scheme contains pores having a preferred orientation distribution.

5. The method of claim 4, wherein the differential effective medium scheme is formulated in terms of the differential equation $$\frac{dA}{d\phi} = \frac{1}{1-\phi} \sum_\alpha \int_0^{\pi/2} \int_0^{2\pi} F_\alpha(\theta, \varphi) H_\alpha(\theta, \varphi) A \, d\varphi \, d\theta$$

where $\alpha$ is aspect ratio, $F_\alpha(\theta,\phi)$ is the probability density function for the orientation distribution of pores and cracks and $\theta$ and $\phi$ are polar angle and azimuth, respectively; A is the compliance tensor of the effective medium (with pores) and $\phi$ is porosity;

$$H_\alpha(\theta, \varphi)_{ijkl} = T_{ijklmnpq} Q(\alpha)_{mnpq}$$

and, $$T_{ijklmnpq} = K_{im} K_{jn} K_{kp} K_{lq}$$

$$K = \begin{bmatrix} \cos(\theta)\cos(\varphi) & -\sin(\varphi) & \sin(\theta)\cos(\varphi) \\ \cos(\theta)\sin(\varphi) & \cos(\varphi) & \sin(\theta)\sin(\varphi) \\ -\sin(\theta) & 0 & \cos(\theta) \end{bmatrix}$$

$$Q(\alpha) = [(C_0 - C^l)S(\alpha) - C_0]^{-1}[C^l - C_0]$$

where tensor Q is calculated in the local coordinate system, $C_o$ is the elastic constant tensor for the model without pores and $C^1$ is the elastic constant tensor for said fluid mixture, and S is the Eshelby tensor, which is a function of aspect ratio.

6. The method of claim 5, further comprising making an anisotropic dry rock approximation by setting $$A = (1-\phi)^P A_0$$

where $A_0$ is the compliance tensor of the model without pores, and $$P = \sum_\alpha \int_0^{\pi/2} \int_0^{2\pi} F_\alpha(\theta, \varphi) H_\alpha(\theta, \varphi) \, d\varphi \, d\theta$$

7. The method of claim 6, wherein the model has multiple pore types, and the different pore types are added to the model proportionately instead of sequentially.

8. The method of claim 6, further comprising expanding the tensor $(1-\phi)^P$ in a power series.

9. The method of claim 7, where in proportional addition of multiple pore types is implemented by:
(a) calculating effective elastic compliance tensor for the model with clay pores;
(b) calculating effective elastic compliance tensor for the model with all pores (wet clay pores and dry sand pores and microcracks); and
(c) performing the anisotropic fluid substitution (putting the fluid mixture into the sand pores and microcracks using the anisotropic Gassmann model) using the effective elastic compliance tensors from the preceding steps.

10. The method of claim 8, wherein the power series expansion is $$(1-\phi)^P = e^{\log(1-\phi)P} = \sum_{k=0}^{\infty} \frac{(\log(1-\phi))^k}{k!} P^k.$$

11. The method of claim 10, further comprising replacing the tensor P by a 9×9 matrix to which P is isomorphic.

12. The method of claim 10, further comprising approximating the result by truncating the power series after N terms, where N is at least 30.

13. The method of claim 1, wherein said mathematical relationships are selected as follows: the portion $\phi_{Clay}$ of the model's pore volume $\phi_T$ that is clay-related pores is given by $\phi_{Clay} = V_{sh}\phi_T$; the portion $\phi_{Sand}$ that is sand-related pores is given by $\phi_{Sand} = (1-V_{sh})\phi_T$, the portion $\phi_{Crack}$ that is microcracks is given by $\phi_{Crack} = \phi_{Init} e^{-\beta\sigma_o}$; and the portion $\phi_{Sand}^{Iso}$ that is sand-related pores with random orientation distribution is given by $\phi_{Sand}^{Iso} = \phi_{Sand} - \phi_{Crack}$, where $V_{sh}$ is the shale volume normalized by grain matrix, $\phi_T = \phi_{Clay} + \phi_{Sand}^{Iso} + \phi_{Crack}$, $\phi_{Init}$ is initial crack porosity at zero overburden stress $\sigma_o$, and $\beta$ is pressure gradient in the subterranean region.

14. The method of claim 1, wherein the first mixing law is the Voigt-Reuss-Hill average.

15. The method of claim 1, wherein the second mixing law is Wood's suspension model.

16. The method of claim 1, further comprising salt dissolved in the water used to form the fluid mixture.

17. The method of claim 1, further comprising:
(j) using the model to invert seismic data from the subterranean region to obtain a model of at least one petrophysical property throughout the subterranean region, thereby transforming the seismic data to a representation of physical features of the subterranean region.

18. The method of claim 1, wherein the at least one petrophysical property includes one or more of a group consisting of porosity, shale volume and water saturation, and the at least one elastic property includes one or more of a group consisting of seismic velocity and attenuation.

* * * * *